United States Patent
Stein (10) Patent No.: US 11,209,178 B2
(45) Date of Patent: Dec. 28, 2021

(54) APPARATUS AND METHOD FOR PASSIVELY COOLING AN INTERIOR

(71) Applicant: BROWN UNIVERSITY, Providence, RI (US)

(72) Inventor: Derek Martin Stein, Providence, RI (US)

(73) Assignee: Brown University, Providence, RI (US)

(*) Notice: Subject to any disclaimer, the term of this patent is extended or adjusted under 35 U.S.C. 154(b) by 0 days.

(21) Appl. No.: 16/918,593

(22) Filed: Jul. 1, 2020

(65) Prior Publication Data

US 2021/0018193 A1 Jan. 21, 2021

Related U.S. Application Data

(63) Continuation of application No. 15/443,001, filed on Feb. 27, 2017, now Pat. No. 10,704,794, which is a
(Continued)

(51) Int. Cl.
*E04C 2/28* (2006.01)
*F24F 5/00* (2006.01)
(Continued)

(52) U.S. Cl.
CPC .............. *F24F 5/0035* (2013.01); *E04B 1/74* (2013.01); *E04C 2/28* (2013.01); *F24F 13/0227* (2013.01); *F24F 2221/17* (2013.01)

(58) Field of Classification Search
CPC .. F24F 5/0035; F24F 13/0227; F24F 2221/17; E04B 1/74; E04C 2/28
See application file for complete search history.

(56) References Cited

U.S. PATENT DOCUMENTS 1,808,829 A * 6/1931 Barnes .................. F24F 5/0007
62/316
2,259,541 A 10/1941 Ballard
(Continued)

FOREIGN PATENT DOCUMENTS

EP 2759403 A1 7/2014
WO 2014/122152 A1 8/2014

OTHER PUBLICATIONS

Yehezkel, Nachman Farchi. "Learning from nature—Thermoregulation Envelopes. A dissertation", TU Delft, Delft University of Technology, 2009, pp. 1-98.
(Continued)

*Primary Examiner* — Devon Russell
(74) *Attorney, Agent, or Firm* — Adler Pollock & Sheehan P.C.

(57) ABSTRACT

A system passively cools, regulates humidity and/or rectifies diffusive transport of water vapor in an interior area within a structure. The system includes a membrane assembly covering a portion of the structure, wherein the membrane has an interior side facing the interior area and an exterior side. The membrane assembly defines a plurality of pores. When cooling, a supply of fluid is provided to the membrane assembly so that capillary action of the pores redistributes the fluid to create evaporation and, in turn, the desired heat flow. The membrane assembly can include an architectural membrane coated with a porous matrix coating to form the pores. A pump can provide the fluid to the interior side of the membrane assembly. Preferably, the architectural membrane is woven PTFE-coated fiberglass and the porous matrix coating is titanium dioxide, zeolites and/or silica gel.

10 Claims, 9 Drawing Sheets

Related U.S. Application Data continuation-in-part of application No. 15/506,074, filed as application No. PCT/US2016/026408 on Apr. 7, 2016.

(60) Provisional application No. 62/300,288, filed on Feb. 26, 2016, provisional application No. 62/143,851, filed on Apr. 7, 2015, provisional application No. 62/186,105, filed on Jun. 29, 2015.

(51) Int. Cl.
*E04B 1/74* (2006.01)
*F24F 13/02* (2006.01)

(56) References Cited

U.S. PATENT DOCUMENTS

| | | | |
|---|---|---|---|
| 2,941,759 A | 6/1960 | Rice et al. | |
| 3,066,498 A | 12/1962 | Schlumbohm | |
| 3,090,212 A | 5/1963 | Anderson et al. | |
| 3,138,009 A * | 6/1964 | McCreight | B64D 13/006 |
| | | | 62/315 |
| 3,231,644 A | 1/1966 | Ming-yang | |
| 3,299,795 A | 1/1967 | Araujo | |
| 3,410,336 A | 11/1968 | Paul | |
| 3,490,718 A | 1/1970 | Vary | |
| 3,893,506 A | 7/1975 | Laing | |
| 3,905,203 A * | 9/1975 | Jacob | F25D 21/14 |
| | | | 62/272 |
| 3,984,995 A | 10/1976 | Starr et al. | |
| 4,000,850 A | 1/1977 | Diggs | |
| 4,002,040 A | 1/1977 | Munters et al. | |
| 4,023,949 A | 5/1977 | Schlom et al. | |
| 4,184,338 A | 1/1980 | Bennett | |
| 4,301,631 A | 11/1981 | Tazaki | |
| 4,309,365 A | 1/1982 | Van et al. | |
| 4,408,596 A | 10/1983 | Worf | |
| 4,482,111 A | 11/1984 | Le Touche | |
| 4,516,631 A | 5/1985 | Russell | |
| 4,552,205 A | 11/1985 | Saunders | |
| 4,556,049 A | 12/1985 | Tchernev | |
| 4,660,390 A | 4/1987 | Worthington | |
| 4,935,169 A | 6/1990 | Ernst | |
| 5,070,933 A | 12/1991 | Baer | |
| 5,296,287 A | 3/1994 | Ribbans | |
| 5,329,785 A * | 7/1994 | Sakurai | E04B 1/942 |
| | | | 165/911 |
| 5,357,726 A | 10/1994 | Effenberger et al. | |
| 5,884,486 A | 3/1999 | Hughes et al. | |
| 6,349,760 B1 | 2/2002 | Budelman | |
| 6,367,275 B1 | 4/2002 | Stephan | |
| 6,367,277 B1 | 4/2002 | Kinkel | |
| 6,434,963 B1 | 8/2002 | Urch | |
| 6,627,444 B1 | 9/2003 | Goledzinowski et al. | |
| 6,820,439 B1 * | 11/2004 | Marek | F24F 5/0035 |
| | | | 62/259.4 |
| 6,948,556 B1 * | 9/2005 | Anderson | F28D 15/0266 |
| | | | 165/104.26 |
| 6,990,816 B1 | 1/2006 | Zuo et al. | |
| 7,464,504 B2 | 12/2008 | Hartzell et al. | |
| 8,209,992 B2 | 7/2012 | Alden | |
| 2002/0011075 A1 | 1/2002 | Faqih | |
| 2002/0166327 A1 | 11/2002 | Brandt et al. | |
| 2003/0056943 A1 | 3/2003 | Dessiatoun et al. | |
| 2004/0115419 A1 | 6/2004 | Qin et al. | |
| 2005/0045030 A1 | 3/2005 | Tonkovich et al. | |
| 2005/0056042 A1 | 3/2005 | Bourne et al. | |
| 2006/0000227 A1 | 1/2006 | Hyland et al. | |
| 2006/0032171 A1 | 2/2006 | Weir et al. | |
| 2006/0123723 A1 | 6/2006 | Weir et al. | |
| 2006/0178264 A1 * | 8/2006 | Kameshima | B32B 27/12 |
| | | | 502/439 |
| 2006/0191278 A1 | 8/2006 | Cooke | |
| 2007/0017590 A1 * | 1/2007 | Tigerfeldt | F24F 13/0281 |
| | | | 138/149 |
| 2008/0028704 A1 | 2/2008 | Cooper et al. | |
| 2008/0086981 A1 | 4/2008 | Kilkis et al. | |
| 2009/0056917 A1 | 3/2009 | Majumdar et al. | |
| 2009/0126371 A1 | 5/2009 | Powell et al. | |
| 2010/0115977 A1 | 5/2010 | Saroka | |
| 2010/0147763 A1 | 6/2010 | Tsou et al. | |
| 2010/0200199 A1 | 8/2010 | Habib et al. | |
| 2010/0287953 A1 | 11/2010 | Urch | |
| 2010/0294467 A1 | 11/2010 | Varanasi et al. | |
| 2012/0009834 A1 | 1/2012 | Augustyniak et al. | |
| 2012/0077015 A1 * | 3/2012 | Zhou | B32B 5/26 |
| | | | 428/300.4 |
| 2014/0020413 A1 | 1/2014 | Sauerbeck et al. | |
| 2014/0144171 A1 | 5/2014 | Smith et al. | |
| 2014/0259964 A1 * | 9/2014 | Rickie | E04D 13/178 |
| | | | 52/1 |
| 2014/0260369 A1 | 9/2014 | Lepoudre | |
| 2014/0272404 A1 | 9/2014 | Shake et al. | |
| 2014/0319706 A1 | 10/2014 | Huizing et al. | |
| 2015/0071978 A1 | 3/2015 | Chang | |
| 2015/0147563 A1 | 5/2015 | Stanis et al. | |
| 2015/0354205 A1 * | 12/2015 | Sieber | E04D 12/002 |
| | | | 52/309.1 |
| 2016/0010876 A1 | 1/2016 | Reuter et al. | |
| 2016/0374411 A1 | 12/2016 | Brooks et al. | |

OTHER PUBLICATIONS

Karamanis et al. "Cooling roofs through low temperature solar-heat transformations in hydrophilic porous materials", Advances in Building Energy Research, vol. 7, Issue 2, 2013, pp. 235-243.

International Search Report and Written Opinion received in International Application No. PCT/US2016/026408, dated Jun. 29, 2016, 11 pages.

* cited by examiner

APPARATUS AND METHOD FOR PASSIVELY COOLING AN INTERIOR

CROSS REFERENCE TO RELATED APPLICATION

This application is a continuation application of U.S. patent application Ser. No. 15/443,001 filed Feb. 27, 2017, which claims priority to U.S. Provisional Patent Application No. 62/300,288, filed Feb. 26, 2016, and is a continuation-in-part of U.S. Utility patent application Ser. No. 15/506,074, filed Feb. 23, 2017, which is a national stage application of Patent Cooperation Treaty Patent Application No. PCT/US2016/026408 filed Apr. 7, 2016, which claims the benefit of U.S. Provisional Patent Application No. 62/143,851, filed Apr. 7, 2015 and U.S. Provisional Patent Application No. 62/186,105, filed Jun. 29, 2015, each of which is incorporated herein by reference.

BACKGROUND OF THE INVENTION

1. Field of the Invention

The subject disclosure relates to methods and systems for structure wall assemblies, and more particularly, to improved methods and systems for: passively cooling an interior area of a structure; passively regulating the temperature of an interior area; passively regulating the relative humidity of the interior area; and/or rectifying diffusive transport of water vapor.

2. Background of the Related Art

The problems with high energy consumption of buildings and the harmful environmental emissions associated with air conditioning are well known. Residential and commercial buildings currently account for 72% of the nation's electricity use and 40% of its carbon dioxide ($CO_2$) emissions each year, 5% of which comes directly from air conditioning. In addition, the refrigerants used in air conditioners are potent greenhouse gases (GHGs) that may contribute to global climate change.

Because the majority of cooling systems run on electricity, and most U.S. electricity comes from coal-fired power plants which produce $CO_2$, there is a pressing need to support improvements that increase the efficiency of cooling technologies and reduce the use of GHG refrigerants. In view of the above, there is a need for an interior cooling system that can reduce building energy consumption and environmental impact.

SUMMARY

Prior art wall assemblies are also susceptible to mold and moisture damage. Thus, there is a need for a more durable structure. The subject technology can passively regulate the temperature of an interior area, which reduces mold and moisture damage. The subject technology can passively regulate the relative humidity of the interior area, which also reduces mold and moisture damage. Still further, the subject technology can rectify diffusive transport of water vapor, which is another way to reduce mold and moisture damage.

The present disclosure is directed to a system and methods for passively cooling an interior area within a structure. The present disclosure provides cooling power to an interior area while using fewer harmful refrigerants and consuming less electrical energy than traditional methods. In one embodiment, a system passively cools an interior area within a structure. The system includes a membrane assembly covering a portion of the structure, wherein the membrane has an interior side facing the interior area and an exterior side. The membrane assembly defines a plurality of pores. When a supply of fluid is provided to the membrane assembly, capillary action of the pores redistributes the fluid to create evaporation and, in turn, the desired heat flow. The membrane assembly can include an architectural membrane coated with a porous matrix coating to form the pores. A pump can provide the fluid to the interior side of the membrane assembly. Preferably, the architectural membrane is woven PTFE-coated fiberglass and the porous matrix coating is titanium dioxide and zeolites. In an alternative embodiment, silica gel is used instead of or in addition to zeolites. In one embodiment, colloidal PTFE is used as a binding agent and the coating is heated. The porous matrix coating can be comprised of several layers, said layers having pores with decreasing radii as they approach the exterior side of the membrane assembly. The plurality of pores may have radii ranging from about 10 nanometers to 100 microns and a length up to about 80 microns. In typical embodiment, the layer(s) are about 80 µm thick but any thickness, such as 160 µm thick, is possible. When saturated with liquid, a liquid content by mass of the porous matrix coating could be in a range of approximately 10-50%. 50% water volume is typical. Preferably, a tension system or a frame system supports the membrane assembly.

Another aspect of the subject disclosure is directed to a method for passively cooling an interior area within a structure. The method includes coating an architectural membrane with a porous matrix coating to form pores, covering a portion of the structure with the architectural membrane, and providing a fluid onto the architectural membrane such that capillary action of the pores redistributes the fluid to create evaporation and, in turn, heat flow out of the interior area. In one embodiment, the method calculates a setpoint for the interior area based upon empirical data related to a cooling profile of the interior area. The empirical data includes square footage of the membrane, temperature, humidity, wind and cloudiness. A cooling fluid, such as water, may be pumped onto the membrane assembly at varying degrees with a corresponding modification of the pumping based upon the setpoint. Typically, the pores redistribute the fluid laterally along the same side of the architectural membrane. The pores may redistribute the fluid from an interior side of the architectural membrane to an exterior side of the architectural membrane, or vice versa. The coating step may include depositing a concentrated slurry including a binding agent, zeolites and/or silica gel on the architectural membrane, then heating the concentrated slurry to set the binding agent and form the porous matrix. The concentrated slurry may include titanium dioxide as a self-cleaning agent. In one embodiment, the method calculates an overall heat transfer coefficient (U-value) for the structure; and calculating a setpoint based upon the U-value.

Still another embodiment of the subject technology is directed to a structure for passively cooling an interior area comprising: a wall structure having a frame, a membrane assembly covering a portion of the frame, wherein the membrane assembly defines a plurality of pores, and a liquid on the membrane assembly such that capillary action of the membrane assembly pores spreads the liquid to create evaporation and, in turn, cooling. A fan system may increase air flow across the membrane assembly and/or provide airflow across the membrane assembly for delivery to a heating and ventilation system. The pores can extend from an interior side to an exterior side of the membrane assembly and the membrane assembly can include an architectural membrane coated with a porous matrix coating to form the pores.

In one embodiment, the subject technology acts like a one-way moisture valve, allowing moisture to exit the wall but not enter the wall. Preferably one side of a vapor barrier membrane is coated with nanoporous and hygroscopic materials like zeolite or silica gel. The humidity-dependent permeability of the vapor barrier, combined with the humidity-dependent water uptake of the nanoporous coat, give the composite membrane the desired nonlinear and asymmetrical vapor transport characteristics. The membranes solve the condensation and durability problems of high-R walls by rectifying humidity variations and pumping moisture out of the wall. The membranes also vary permeability with changes in humidity and temperature to keep out unwanted vapor while still allowing the enclosure to breath.

Preferably, water is distributed across the surface of the enclosure at a rate that balances evaporation. Several material properties to optimize include, without limitation: porosity; bulk density; thermal conductivity; specific heat capacity; permeability; moisture storage function; liquid transport coefficients (suction, redistribution and/or sorptivity); enthalpy of drying; and other like hygrothermal properties.

One embodiment of the subject technology is directed to a system for passively regulating a temperature of an interior area within a structure including a membrane assembly covering a portion of the structure, wherein the membrane assembly has an interior side facing the interior area and an exterior side, the membrane assembly defines a plurality of pores, and a supply of fluid provided to the membrane assembly such that capillary action of the pores redistributes the fluid to create evaporation and, in turn, heat flow. The membrane assembly may include an architectural membrane coated with a porous matrix coating to form the pores. A pump can provide the fluid to the interior side of the membrane assembly. The architectural membrane can be woven PTFE-coated fiberglass and the porous matrix coating is titanium dioxide, zeolites and/or silica gel. In one recipe, the porous matrix coating is comprised of several layers, said layers having pores with decreasing radii as they approach the exterior side of the membrane assembly. Preferably, the porous matrix coating includes a polymer or resin used as a binder to adhere silica gel particles and the architectural membrane is fabricated from a nylon/polyamide membrane. Alternatively, the porous matrix coating includes a paint used as a binder to adhere silica gel particles to the architectural membrane.

Another embodiment of the subject technology is a method for passively regulating a relative humidity of an interior area within a structure. This method includes the steps of: forming an architectural membrane with first and second membranes separated to form a space therebetween, the first membrane being a vapor barrier; filling the space with a high water vapor permeability material; coating the second membrane with a porous matrix coating to form pores; covering a portion of the structure with the architectural membrane; and providing a fluid onto the architectural membrane such that capillary action of the pores redistributes the fluid to create evaporation and, in turn, heat flow out of the interior area. The method can also include embedding silica gel particles directly in the first membrane as the first membrane is formed, wherein the first membrane is nylon and/or coating the first membrane with silica gel particles and then applying heat. The high water vapor permeability material can be fiberglass and/or rock wool. The method can also include applying electric fields to the first membrane to promote adhesion of a slurry of silica gel particles thereto and/or growing a layer of silica gel on the first membrane by coating one side of the membrane with a silica gel solution followed by evaporation. Preferably, the membrane varies in permeability with changes in humidity and temperature to keep out unwanted vapor.

Still another embodiment of the subject technology is a structure for rectifying diffusive transport of water vapor into an interior area of an enclosure. The structure includes a wall structure having a frame and a membrane assembly covering at least a portion of the frame to form the enclosure. The membrane assembly has: an interior side and an exterior side; a porous layer on the interior side with a high capacity for water adsorption; and a water vapor layer on the exterior side that is a high vapor barrier at low relative humidity and become more water permeable at high relative humidity. The porous layer can define a plurality of pores that spread liquid. A liquid can be on the membrane assembly such that capillary action of the membrane assembly pores to create evaporation and, in turn, cooling. The pores may spread liquid by branching into smaller channels.

It should be appreciated that the subject technology can be implemented and utilized in numerous ways, including without limitation as a process, an apparatus, a system, a device, a method for applications now known and later developed such as a computer readable medium and a hardware device specifically designed to accomplish the features and functions of the subject technology. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The subject technology overcomes many of the prior art problems associated with cooling building interiors by using architectural membranes and membrane-based wall assemblies with nanoporous coatings. The advantages, and other features of the technology disclosed herein, will become more readily apparent to those having ordinary skill in the art from the following detailed description of certain preferred embodiments taken in conjunction with the drawings which set forth representative embodiments of the present disclosure and wherein like reference numerals identify similar structural elements. It is understood that references to the figures such as interior, exterior, up, down, upward, downward, left, and right are with respect to the figures and not meant in a limiting sense.

Figure 1:
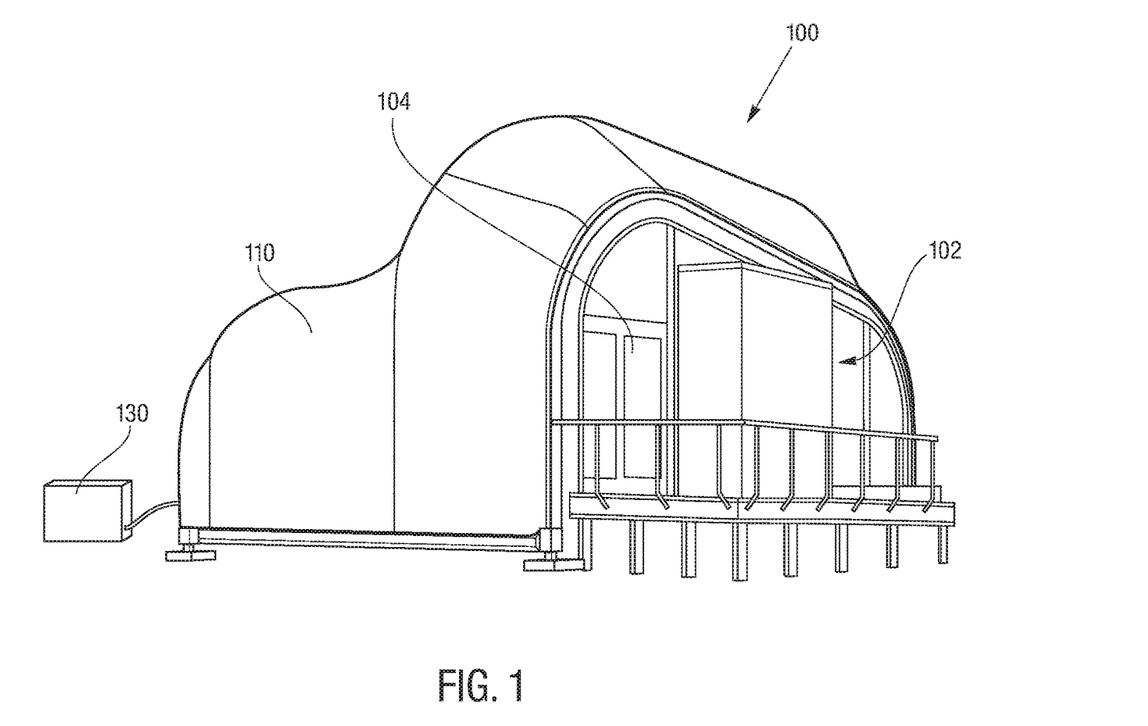
FIG. 1 is a perspective view of a house utilizing a system in accordance with the subject disclosure.

Referring now to FIG. 1, a house utilizing a system in accordance with one embodiment of the present disclosure is referred to generally by reference numeral 100. The house 100 includes an interior area 102 that is maintained at a cool and comfortable temperature in an efficient manner. The house 100 has a membrane assembly 110 stretched taught across a tensile framing system (not shown). The house 100 also includes doors 104 for moving in and out of the interior area 102. In brief overview, water is delivered, mechanically and/or passively, to the membrane assembly 110, which spreads the water by capillary action for enhanced evaporation. Simultaneously, or additionally, the membrane assembly 110 can serve the role of siding, sheathing, a weather barrier, and/or a vapor barrier. In one embodiment, the house 100 includes a water pump 130 connected to a supply of water such as a well or municipal source. Greywater may also be used instead of, or in addition to, other water sources to reduce, or even eliminate, the strain on water resources. The water pump 130 provides water to the membrane assembly 110. Additionally, water can reach the membrane assembly 110 by, for example, spraying water along membrane assembly 110, dripping water along membrane assembly 110, or through the water content of air as the air flows along the membrane assembly 110. As water evaporates from the membrane assembly 110, the latent heat of vaporization is extracted, some of the heat from the interior 102, generating cooling power on the order of hundreds of Watts per Square meter. The evaporation rate increases with temperature, thus, the potential to passively cool the interior increases with temperature as well.

Figure 2A:
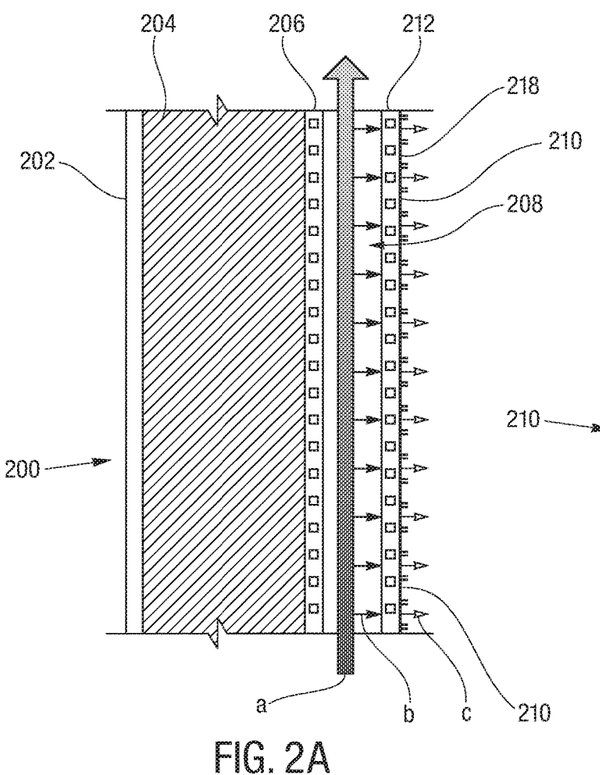
FIG. 2A is a partial cross-sectional view of a wall assembly in accordance with the subject disclosure.

Referring now to FIG. 2A, a partial cross-sectional view of a wall assembly 200 in accordance with the subject technology is shown. The wall assembly 200 is for a building 600B of the type shown in FIG. 6B. The wall assembly 200 includes an interior layer 202. The interior layer 202 can be any material typically used in the interior of a building, such as drywall or plaster. A layer of insulation 204 adjacent to the interior layer 202 provides efficient thermal retention for the building 600B. A layer of cladding 206 protects the insulation 204 and the interior layer 202 from the outside elements. Although not shown, structural members such as 2×4s or 2×6s are used to frame the building 600B. A membrane assembly 210 is spaced from the cladding 206 to form an air gap 208. The air gap 208 allows upward air flow, depicted by arrow "a", between cladding 206 and the membrane assembly 210. The air flow may move in any direction and is preferably driven by an air handler including a fan. In one embodiment, the temperature in the air gap drops close to the wet bulb temperature. The membrane assembly 210 includes an architectural fabric layer 212 having a coating 218, shown here on the exterior of the membrane assembly 210. The architectural fabric layer 212 may be formed using typical commercial architectural materials for exterior membranes, for example, woven polytetrafluoroethylene coated fiberglass. The membrane assembly may also use a more rigid base layer instead of architectural fabric depending upon the particular application and building structure.

Figure 2B:
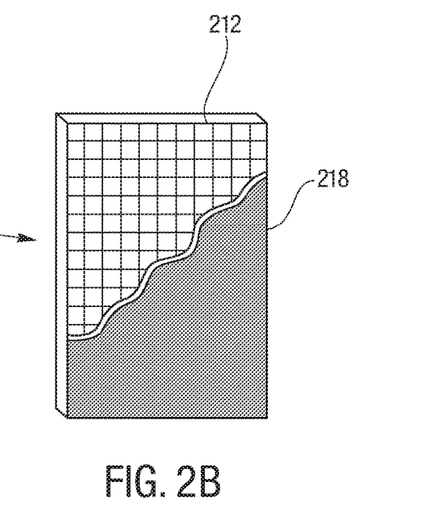
FIG. 2B is a partial cross-sectional view of a membrane assembly in accordance with the subject disclosure.

The coating 218 defines a plurality of pores 216 which absorb and distribute water across the membrane assembly 210 through capillarity to enhance evaporation of water applied thereto. The coating 218 may be any material which allows for water distribution, preferably through capillary effect, such as a porous ceramic. Capillary effect spreads the water applied to the coating 218 over a wide area to replenish what is lost to evaporation. Alternatively, the coating 218 may be a different material which allows water distribution such as cloth, hydrogels, or cellulite. At temperatures where building cooling is desired, evaporation of water applied from the coating 218 causes heat to flow from the air gap 208 through the membrane assembly 210, shown by arrow "b". Additionally, evaporation causes heat flow from the membrane assembly 210 out of the wall assembly 200, as shown by arrow "c". Thus, the latent heat of vaporization extracts heat as shown by heat flow arrows "b" and "c", cooling the air gap 208. The cooling air gap 208, in turn, cools the interior of the building 600B and reduces the cooling load for maintaining the interior 602 at the desired temperature. Referring now to FIG. 2B, a partial cross-sectional view of the membrane assembly 210 is shown. For the purposes of illustration, the membrane assembly 210 is shown only partially covered by a coating 218, such that underlying the architectural fabric layer 212 of the membrane assembly 210 is visible.

Figure 2C:
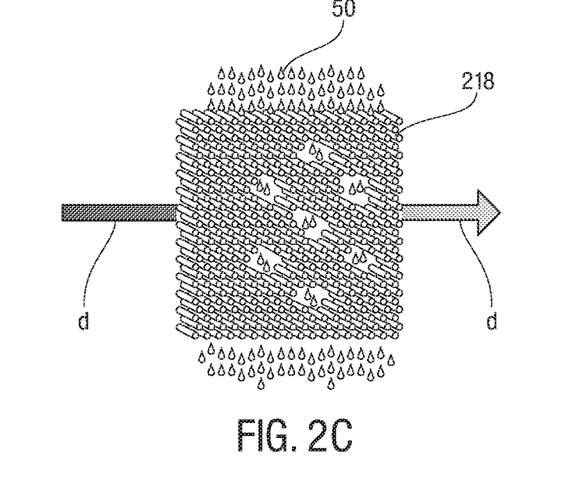
FIG. 2C is a schematic view of the coating of a membrane assembly in accordance with the subject disclosure, exaggerated for illustration of structural operation.

Referring now to FIG. 2C, a schematic view of the coating 218 is shown, exaggerated for illustration of structural operation. The coating 218 defines a plurality of pores 216. Although the pores 216 are shown as uniform and aligned, the pores 216 in most practical applications will be randomly formed and arranged. The pores 216 distribute water 50 across membrane assembly 210 via capillary action. While, for illustrative purposes, the pores 216 are depicted as running generally parallel throughout coating 218, one skilled in the art would recognize that the pores 216 formed through the creation of a nanoporous coating result in a network which is not of any particular or uniform configuration. By distributing the water 50 across the membrane assembly 210, the pores 216 allow for increased evaporation, causing heat transfer as shown by arrow "d".

Figure 3:
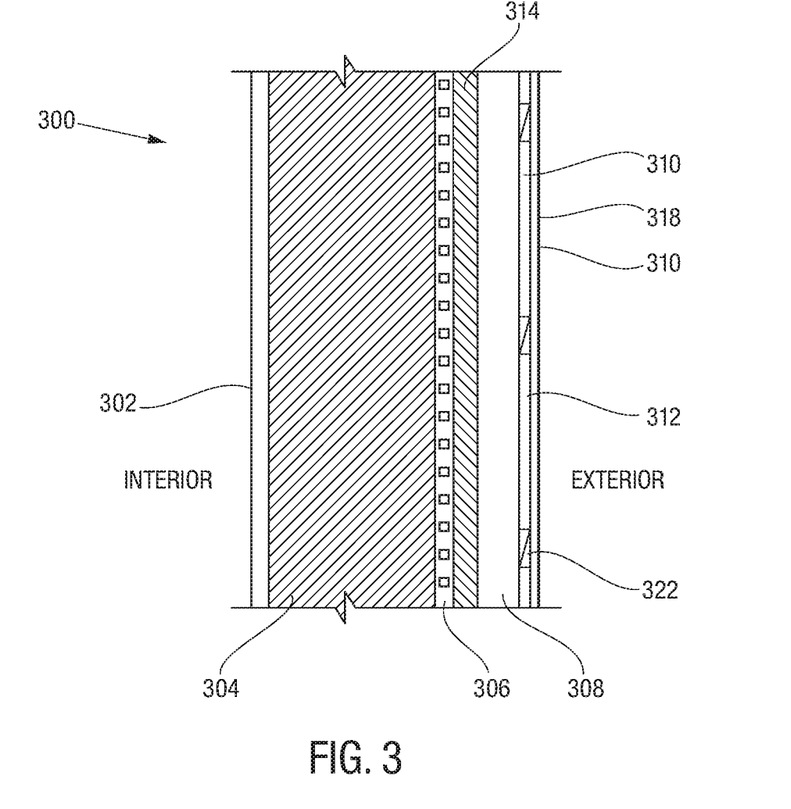
FIG. 3 is a partial cross-sectional view of a wall assembly in accordance with the subject disclosure designed for use in a typical wood-frame structure.

Referring now to FIG. 3, a partial cross-sectional view of a wall assembly 300 in accordance with the subject disclosure is shown. The wall assembly 300 is of a type typically used in brace-frame structures of the type shown in the building 600B of FIG. 6B. As will be appreciated by those of ordinary skill in the pertinent art, the wall assembly 300 utilizes similar principles to the wall assembly 200 described above. Accordingly, like reference numerals preceded by the numeral "3" instead of the numeral "2" are used to indicate like elements. A primary difference of the wall assembly 300 is an air barrier 314 to protect the cladding 306 from the elements. The air barrier 314 may be formed of any material typically used in building construction, such as TYVEK® house wrap available from DuPont of Wilmington, Del. The membrane assembly 310 may have the same architectural fabric layer 312 with a coating 318 or a different structure and arrangement. Structural elements 322 provide support in the wall assembly 300. The structural elements 322 may be ribs, studs, posts and the like.

Figure 4A:
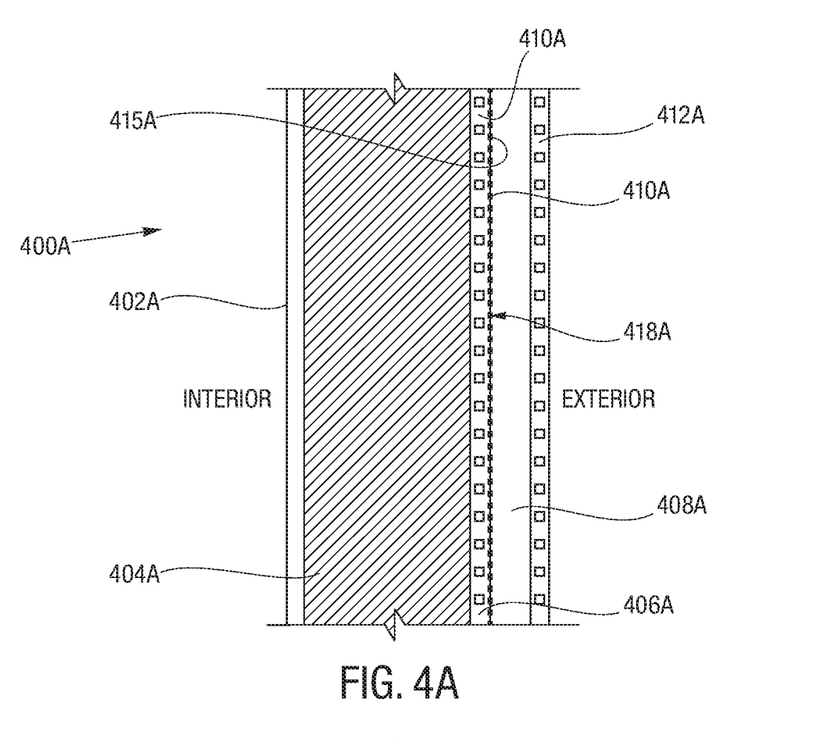
FIG. 4A is a partial cross sectional view showing a possible coating location in a wall assembly in accordance with the subject disclosure.
Figure 4B:
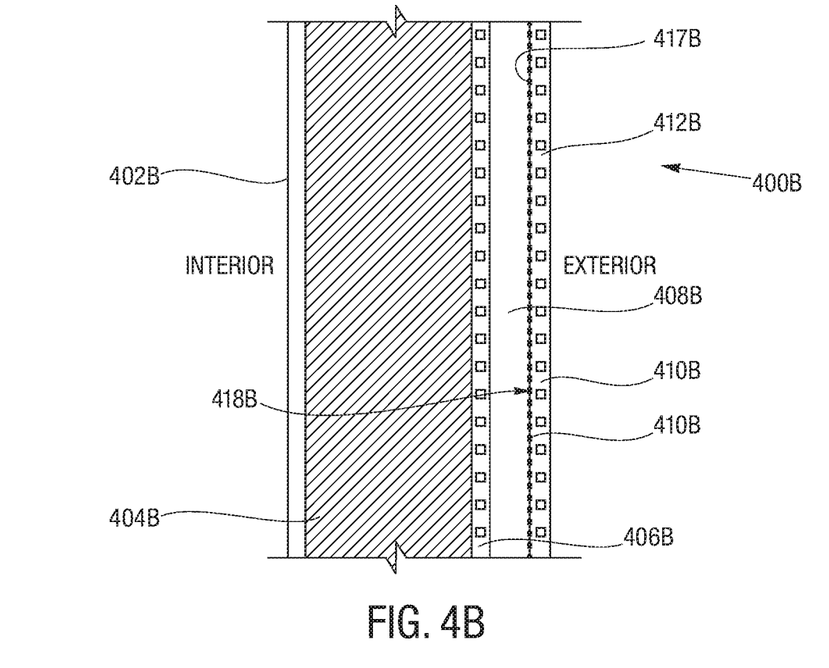
FIG. 4B is a partial cross sectional view showing a possible coating location in a wall assembly in accordance with the subject disclosure.

Referring now to FIGS. 4A and 4B, partial cross-sectional views of wall assemblies 402A-B are shown, respectively. As will be appreciated by those of ordinary skill in the pertinent art, the wall assemblies 400A-B utilize similar principles to the wall assembly 200 described above. Accordingly, like reference numerals preceded by the numeral "4" instead of the numeral "2" are used to indicate like elements.

The wall assemblies 400A-B depict possible locations for the coating 418A-B. The coating 418A-B may be applied to one of the various layers of walls assemblies 418A-B, including for example, along the siding, the exterior insulation, and/or the cladding. Multiple coatings may be present, say for example, on each side of the air gaps 408A-B.

In the wall assembly 400A of FIG. 4A, the membrane assembly 410A includes cladding 406A with a coating 418A. The coating 418A runs along the exterior side 415A of the cladding 406A, directly adjacent to air gap 408A, facilitating water distribution and evaporation along the exterior side of cladding 406.

In the wall assembly 400B, the membrane assembly 410B includes an architectural fabric layer 412B with an inner coating 418B. The coating 418B runs along the interior side 417B of membrane assembly 410B, directly adjacent to air gap 408B, facilitating water distribution and evaporation along the interior side 417B of the membrane assembly 410B. In the configuration shown in these wall assemblies 400A, 400B, evaporation causes the air in the air gaps 408A, 408B to be cooled directly while also being made more humid.

Figure 5A:
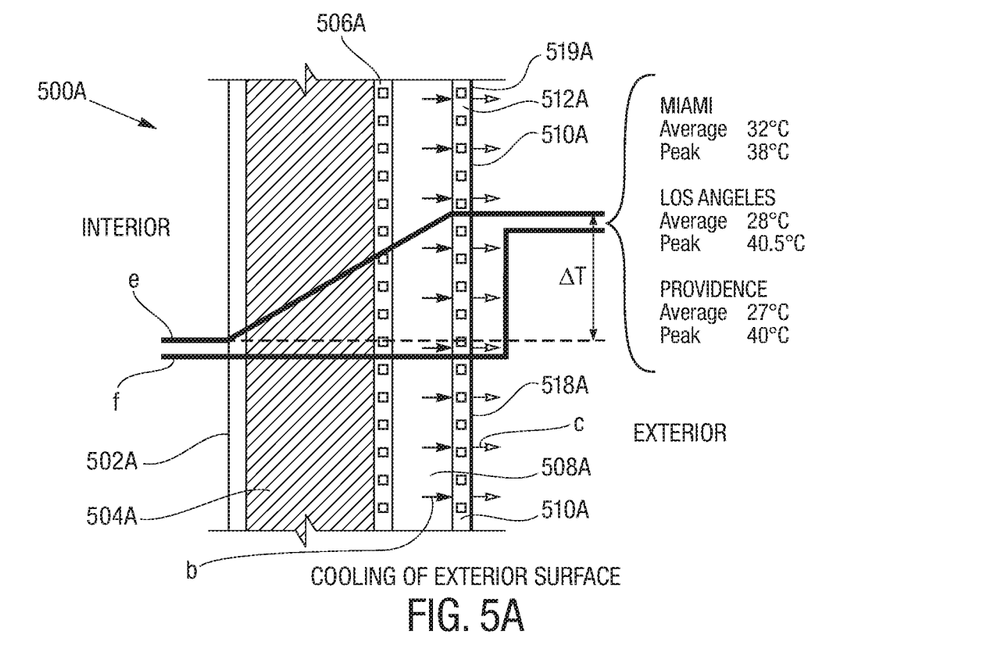
FIG. 5A is a partial cross sectional view showing a wall assembly reducing or reversing the heat flux through an enclosure in accordance with the subject disclosure.
Figure 5B:
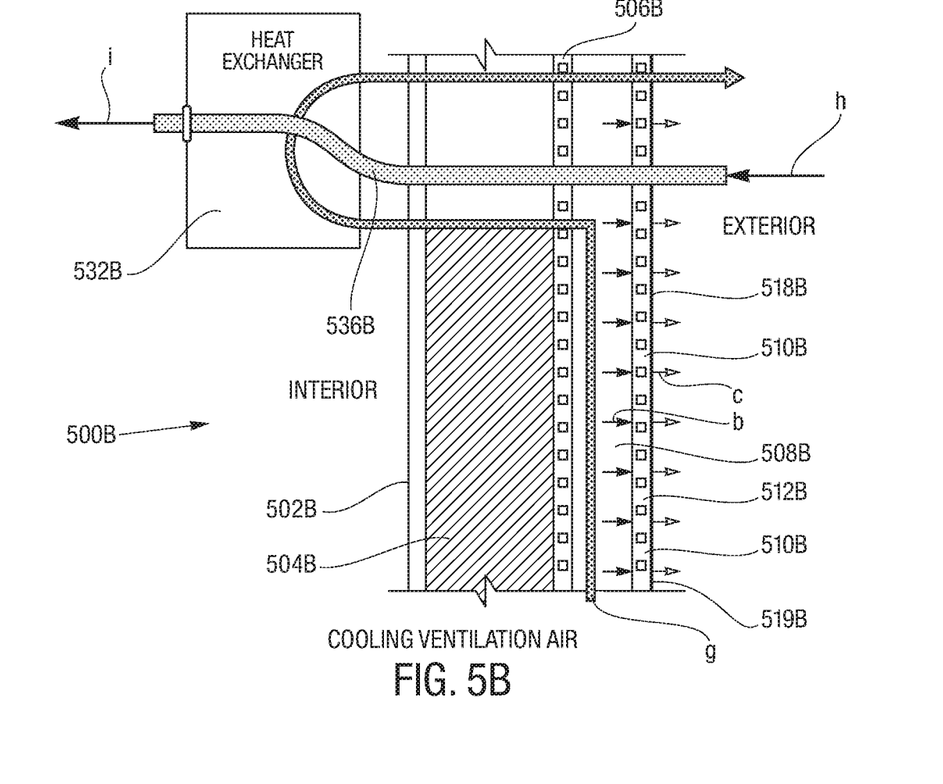
FIG. 5B is a partial cross sectional view showing a wall assembly using evaporatively chilled air as a coolant for ventilation air in accordance with the subject disclosure.
Figure 5C:
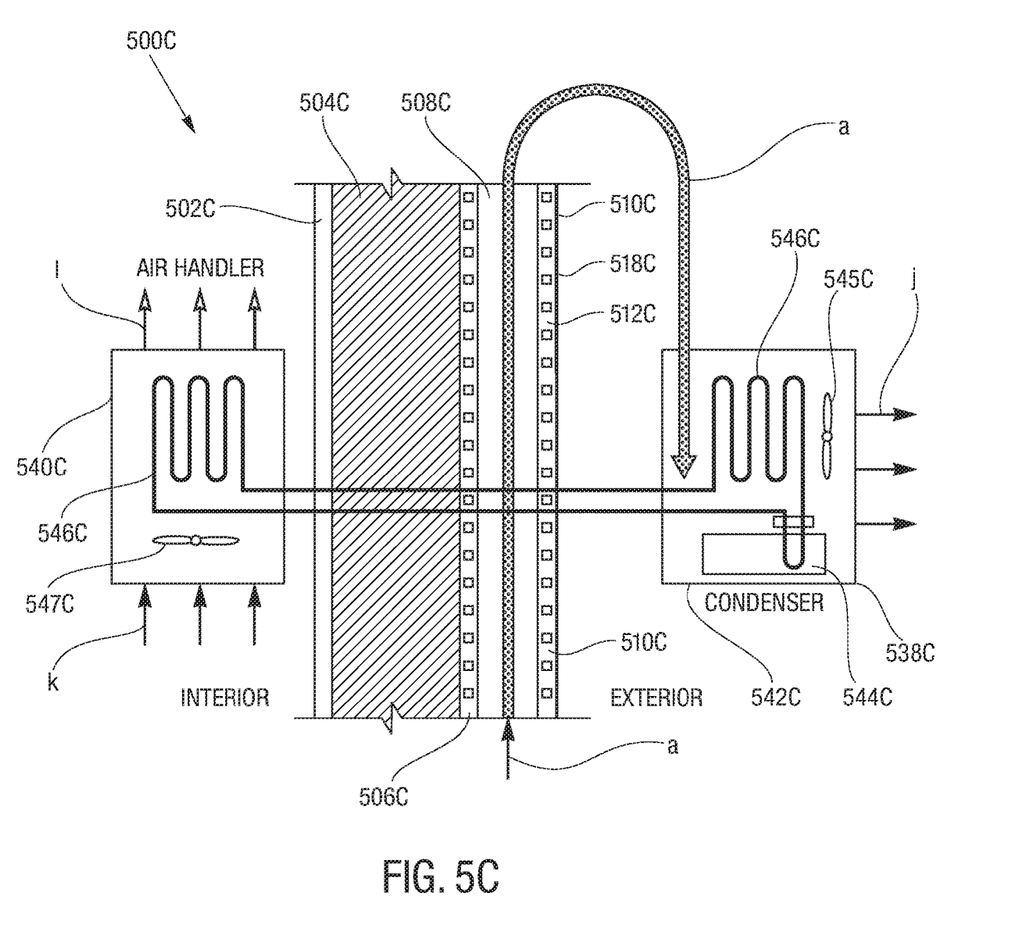
FIG. 5C is a partial cross sectional view showing a wall assembly boosting the efficiency of an air conditioner in accordance with the subject disclosure.

Referring now to FIGS. 5A-C, partial cross-sectional views of wall assemblies 500A-C in accordance with the subject disclosure are shown, respectively. As will be appreciated by those of ordinary skill in the pertinent art, the wall assemblies 500A-500C utilize similar principles to the wall assembly 200 described above. Accordingly, like reference numerals preceded by the numeral "5" instead of the numeral "2" are used to indicate like elements. FIG. 5A is included to help compare and contrast standard wall temperature change versus the improved wall temperature change of wall assemblies in accordance with the subject technology. The primary difference in FIGS. 5B and 5C is that the wall assemblies 500B, 500C, depict various mechanisms for harnessing evaporative cooling power, in accordance with the subject technology. The following description is directed primarily to the differences.

Referring now to FIG. 5A, a partial cross sectional view of a wall assembly 500A is shown. The subject technology can reduce or even reverse the heat flux through an enclosure. FIG. 5A has temperature gradient lines "e" and "f". Gradient line "e" represents the temperature gradient across a standard prior art wall. When the interior has a significantly lower temperature and setpoint than the exterior, as evidenced by $\Delta T$, heat will flow from the exterior to the interior. However, gradient line "f" illustrates the temperature gradient across the wall assembly 500A in which the wall assembly 500A is maintained near the interior/setpoint temperature. In fact, if the wall assembly 500A is below the interior temperature, heat flows along the arrows "b" and "c". In effect, the wall assembly 500A being cooled by evaporative cooling, cools the interior and/or lessens the cooling energy required to maintain the cooler interior setpoint. During hot temperature weather, the cooling power advantages are substantial Referring now to FIG. 5B, a partial cross sectional view of another wall assembly 500B using evaporatively chilled air as a coolant for ventilation air in accordance with the subject disclosure is shown. Evaporation on the exterior side 519B of the membrane assembly 510B causes heat flow from the air gap 508B through the membrane assembly 510B, as shown by arrow "g". Further, evaporation causes heat flow from the membrane assembly 510B out of the wall assembly 500B. The latent heat of vaporization is extracted, as shown by heat flow arrows "b" and "c", causing cooling of the air gap 508B.

Evaporatively cooled air from the air gap 508B travels between cladding 506B and the membrane assembly 510B, as depicted by arrow "g", and into a heat exchanger 532B. Outside air enters a ventilation duct 536B, as shown by arrow "h". The air in the ventilation duct 536B is moved through the heat exchanger 532B, and exits the heat exchanger 532B, as shown by arrow "i".

In the heat exchanger 532B, the cooled air from the air gap 508a circulates around the ventilation duct 536B and, in turn, cools the air in the ventilation duct 536B. In this way, the air passing through the heat exchanger 532B via the ventilation duct 536B is cooled by the air from the air gap 508A. The air exiting the heat exchanger 532B may directly cool the interior or pass into a ventilation unit, such as an air conditioner to provide pre-cooled air thereto. By passing the evaporatively cooled air from the air gap 508B through the heat exchanger 532B to cool the air in the ventilation duct 536B, the energy required to cool the interior is reduced.

Referring now to FIG. 5C, a partial cross sectional view showing still another wall assembly 500C for boosting the efficiency of an air conditioning unit 538C in accordance with the subject disclosure is shown. The air conditioning unit 538C includes an air handler 540C and a condenser assembly 542C. A refrigerant is contained within a coil assembly 546C that extends from the air handler assembly 540C to the condenser assembly 542C. As such, the refrigerant is driven by a pump/compressor assembly 544 to circulate throughout the coil assembly 546C. The condenser assembly 542C includes a fan 545C to circulate air across the coil assembly 546C as is well known. The air handler assembly 540C includes a fan 547C for moving interior air across the coil assembly 546C to cool such air.

Similar to the other embodiments mentioned herein, evaporative cooling from the membrane assembly 510C causes cooling of the air in air gap 508C. Cooled air from the air gap 508C travels, as shown by arrows "a", between membrane assembly 510C and the cladding 506C, and into the condenser assembly 542C. The condenser assembly 542C operates by cooling and condensing refrigerant in the coil assembly 546C. As the refrigerant is cooled in the condenser assembly 542C, heat in the form of hot air exits to the exterior, as shown by arrow "j".

By providing cooled air from air gap 508C to the condenser assembly 542C, rather than outside air, the efficiency of the condenser assembly 542C is improved. Cooled refrigerant from the condenser assembly 542C is then returned to the air handler assembly 540C, via the coil assembly 546C. Air from the interior of the structure enters the air handler assembly 540C, as shown by arrow "k", and, in turn, is cooled by passing over the coil assembly 546C. After being cooled such air is then passed back into the interior as shown by arrow "l".

It would be understood by one skilled in the art that the embodiments shown in FIGS. 5A-C could be used individually or in concert with one another to generate cooling power. Thus, the subject disclosure is capable of simultaneously reducing or reversing the heat flux through the enclosure, using evaporatively chilled air as a coolant for ventilation air, and boosting the efficiency of an air conditioner. It would also be understood by one skilled in the art that these embodiments could be used in combination with other means for cooling an interior.

Figure 6A:
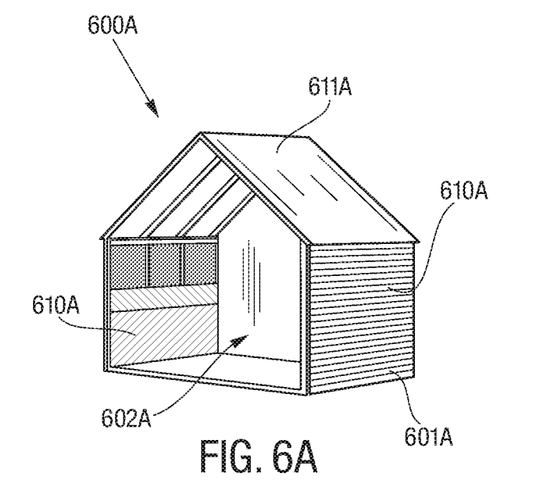
FIG. 6A is a front view of a structure designed in accordance with typical wood-frame construction and utilizing a wall assembly in accordance with the subject disclosure.

Referring now to FIG. 6A, a building or structure 600A designed in accordance with typical wood-frame construction and utilizing a wall assembly in accordance with the subject disclosure is shown. The structure 600A has a traditional wood frame and utilizes wall assemblies 601A, such as those depicted in FIG. 3, to create a code-compliant wall. The wall assembly can have a membrane assembly 610A. A membrane assembly 610A may also be placed across the roof 611A of the structure. Alternatively, or additionally, the membrane assembly 610A could placed along some other portion of the wall assembly, for example, the side walls of the structure or as depicted in FIGS. 4A-4B.

Figure 6B:
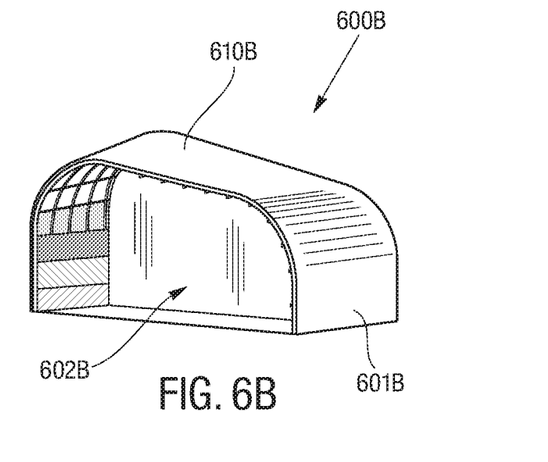
FIG. 6B is a front view of a structure designed in accordance with typical braced frame construction and utilizing a wall assembly in accordance with the subject disclosure.

Referring now to FIG. 6B, another building or structure 600B designed in accordance with typical brace frame construction and utilizing a wall assembly in accordance with the subject disclosure is shown. A braced frame is a similar structure to a wood lattice. A brace frame provides an open framework that is overlapped or overlaid in a regular, crisscross pattern to form a grid. The grid can be made of any material such as wood or steel. A membrane assembly 610B, in accordance with one embodiment, is shown stretched taught across the grid as the exterior layer of the wall assembly 601B. Alternatively, or additionally, the membrane assembly 610B could be placed along another portion of the wall assembly, for example, as depicted in FIGS. 4A-4B.

Figure 6C:
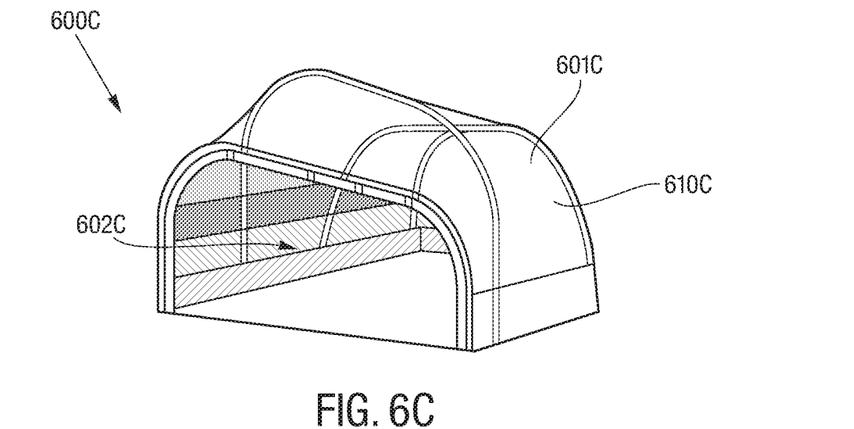
FIG. 6C is a front view of a structure designed in accordance with typical tensile frame construction and utilizing a wall assembly in accordance with the subject disclosure.

Referring now to FIG. 6C, a building or structure 600C designed in accordance with typical brace frame construction and utilizing a wall assembly in accordance with the subject disclosure is shown. A braced frame is a similar structure to a wood lattice. The lattice or grid provides an open framework that is overlapped or overlaid in a regular, crisscross pattern. The grid can be made of various materials, such as wood or steel. A membrane assembly 610C in accordance with one embodiment is shown stretched taught as the exterior layer of the wall assembly 601C. Alternatively, or additionally, the membrane assembly 610 could be placed along another portion of the wall assembly, for example, as depicted in FIGS. 4A-4B.

Figure 7:
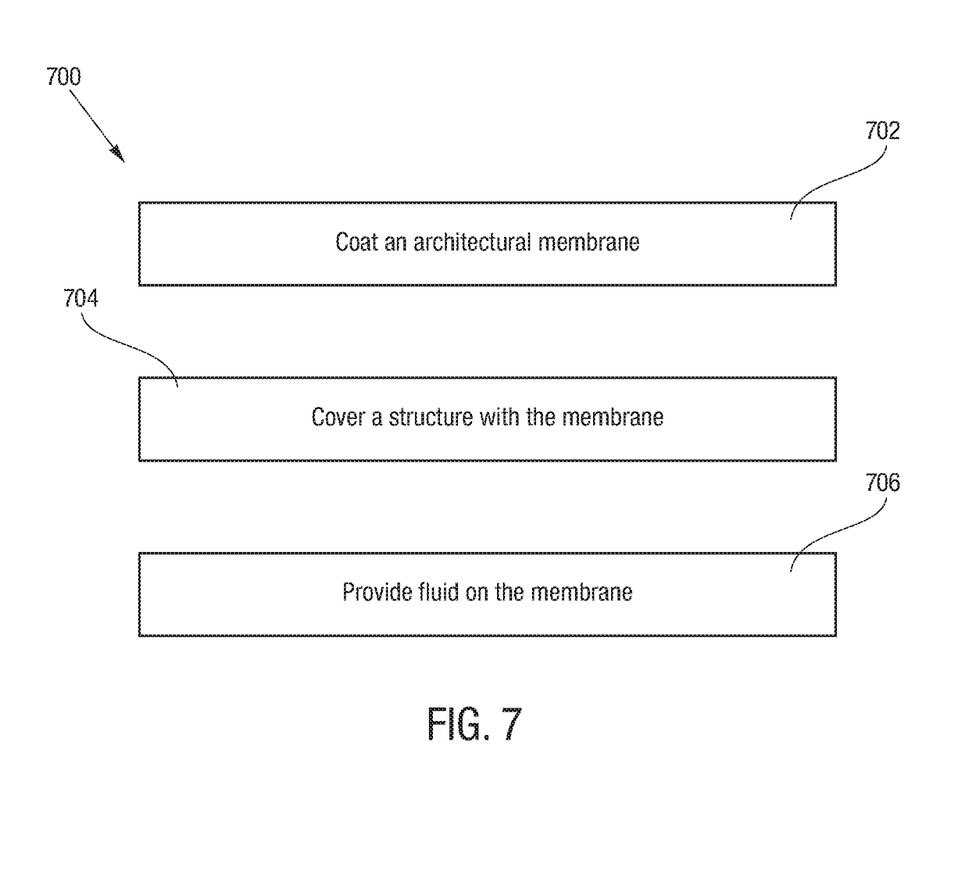
FIG. 7 is a block diagram showing a method of passively cooling an interior area within a structure in accordance with the subject disclosure.

Referring now to FIG. 7, a flowchart 700 showing a method of passively cooling an interior area within a structure in accordance with the subject disclosure is shown. The flowchart 700 includes the following steps. First, at step 702, an architectural membrane is coated with a porous matrix to form pores 702. The coating may be any material which allows for and/or enhances fluid distribution for increased evaporation. Preferably, the coating forms pores that distribute the fluid through capillary effect such as a porous ceramic coating. Such a ceramic coating can be made up of titanium dioxide particles, zeolites and/or silica gel. Zeolite particles are hygroscopic aluminosilicate materials whose micro- and nanoporous molecular structures offer a large capillary effect. Zeolites are known to absorb water more strongly and release it more slowly as the diameter of the pores decreases. Therefore the type and composition of zeolites can be used to tune the evaporation profile (the trajectory of the evaporation rate with time). The ceramic coating can be formed, for example, by depositing titanium dioxide and zeolite particles from a slurry containing colloidal polytetrafluoroethylene, the lattermost acting as a binding agent when heated above 260 degrees Celsius. The quantity of polymer used to bind particles in the coating may influence evaporation by blocking a fraction of the pores. The materials can then be heated to dry and fuse them. This technique can be repeated to produce layered coatings. This approach has been used commercially to produce architectural membranes with 5 μm thick coatings of titanium dioxide, which confers self-cleaning properties. A coat that is 160 μm thick would hold approximately enough water to fuel a high cooling flux of 300 $Wm^{-2}$ for 10 minutes without replenishing the water. One skilled in the pertinent art will recognize that similar ceramic coatings can be formed using various compositions of zeolite, titanium dioxide, binding polymer and/or silica gel. Any fluid may be used as the cooling agent.

At step 704, a portion of a structure is covered with the architectural membrane. The structure may be any of the wall assemblies above, variations thereof, and other structures as would be appreciated by those of ordinary skill in the art based upon review of the subject disclosure. At step 706, a fluid is provided onto the architectural membrane such that capillary action of the pores redistributes the fluid to create evaporation and, in turn, heat flow out of the interior area of the structure.

In one embodiment, a set point temperature for the interior area can be calculated based on empirical data related to a cooling profile. Relevant data related to a cooling profile may include, for example, square footage of the membrane, temperature, humidity, wind, cloudiness, the type of cooling fluid, the method and rate of administration of the cooling fluid, and/or empirical performance data. The setpoint may also be based on the overall heat transfer coefficient, or U-value. Fluid may then be distributed, in accordance with step 706, by pumping fluid across the membrane at a varying rate based upon the setpoint.

Figure 8:
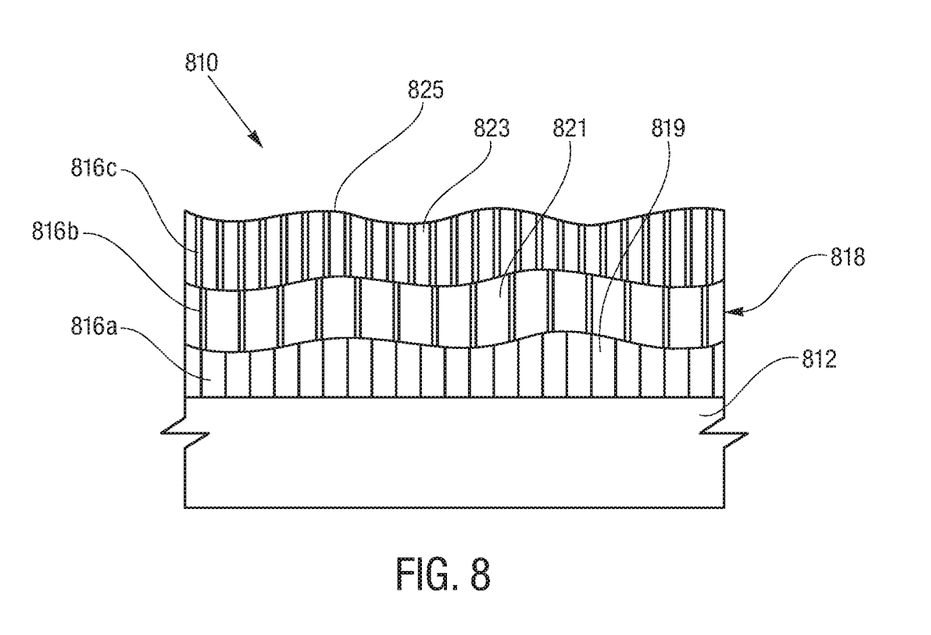
FIG. 8 is a partial cross-sectional view of a membrane assembly with a nanoporous coating in accordance with the subject disclosure, exaggerated to show pore structure.

Referring now to FIG. 8, a partial cross-sectional view of a membrane assembly with a nanoporous coating in accordance with the subject disclosure, exaggerated to show pore structure, is shown generally by reference numeral 810. The membrane assembly 810 has a coating 818 which includes three layers 819, 821, 823 over an architectural fabric layer 812. While, for illustrative purposes, the coating has pores 816a, 816b, 816c which are depicted as running parallel throughout coating 818, one skilled in the art would recognize that pores 816a, 816b, 816c formed through the creation of a nanoporous coating result in a network which is not of any particular or uniform configuration. The first coating layer 819 is attached directly to the architectural fabric layer 812. A second coating layer 821 is shown over the first coating layer 819, and a third coating layer 823 is shown over the second coating layer 821. The third coating layer 823 has a membrane assembly surface 825 on the side furthest from the architectural fabric layer 812. The coating layers 819, 821, 823, have pores 816a, 816b, 816c of a generally decreasing radius as they move away from the architectural fabric layer 812 towards the membrane assembly surface 825. In generally, the capillary effect increases as the size of the pore radii decreases. In one embodiment, a multitude of small pores 816c near the membrane assembly surface 825 increases the capillary effect of the coating 818 while large pores 816a closer to the architectural fabric layer 812 enhance the flow rate by lowering the hydrodynamic impedance. In one embodiment, pores 816c nearest the membrane assembly surface 825 have radii as low as several nanometers while pores 816a nearest the architectural fabric layer 812 have radii of several micrometers. Pores with radii of other sizes may be used to balance the evaporation rate with the rate at which the coating 218 passively fuels the evaporative cooling process. By balancing the evaporation rate with the rate at which the evaporative cooling process is fueled, the need for periodic misting or wetting of the coating can be minimized or avoided. One skilled in the art would recognize that coating 818 may contain various numbers of layers having various pore sizes to allow capillary action across membrane assembly 810.

It is envisioned that the air conditioning unit, water pump, thermostat control and the like would include electronics such as a processor and memory to form a controller for utilizing the setpoint for control. Depending upon the sensors and setpoints, various modes of operation can be utilized. For example, the subject technology can passively regulate the temperature of an interior area. The relative humidity of the interior area can also be passively regulated. The subject technology can also rectify diffusive transport of water vapor. Additionally, user interfaces in the form of displays, buttons, scanners, usb ports and the like would be incorporated to input and output data. Additionally, the controller could have wireless capabilities for interaction with a network, smartphone, tablet and the like for additional input and output of data and information. Although shown with reference to smaller buildings, large structures like airports, stadiums, factories, warehouses and the like could benefit equally as well from the subject technology.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., structural elements, sheaths, vapor barriers, water barriers, wind barriers, cladding and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A method for regulating transport of water vapor, comprising:
    covering a portion of a base layer with a membrane assembly, wherein the membrane assembly includes:
    a first side and a second side;
    a porous layer positioned on the first side of the membrane assembly, the porous layer exhibiting humidity dependent water adsorption; and
    a water vapor barrier layer positioned on the second side of the membrane assembly, wherein the water vapor barrier exhibits permeability to water vapor that increases with increasing relative humidity;
    wherein diffusive transport of water vapor through the membrane assembly is rectified.

2. The method of claim 1, wherein the base layer is a fiberglass.

3. The method of claim 2, wherein base layer is a fiberglass coated with polytetrafluoroethylene (PTFE).

4. The method of claim 1, wherein the porous layer defines a plurality of pores.

5. The method of claim 1, wherein the porous layer is nanoporous.

6. The method of claim 1, wherein the porous layer is a ceramic.

7. The method of claim 1, wherein the porous layer is formed from at least one of an oxide, a zeolite, or a silica gel.

8. The method of claim 1, wherein the porous layer comprises a plurality of layers.

9. The method of claim 8, wherein the radii of pores within respective porous layers increases with distance from the water vapor barrier layer.

10. The method of claim 1, wherein the water vapor barrier layer is formed from nylon.

* * * * *